Dec. 1, 1959   C. F. SCHWAN   2,915,656
HEAT EXCHANGER FOR DYNAMOELECTRIC MACHINE
Filed Oct. 19, 1956   3 Sheets-Sheet 1

INVENTOR.
CLARENCE F. SCHWAN
BY Woodling and Krost
attys.

Dec. 1, 1959 C. F. SCHWAN 2,915,656
HEAT EXCHANGER FOR DYNAMOELECTRIC MACHINE
Filed Oct. 19, 1956 3 Sheets-Sheet 2
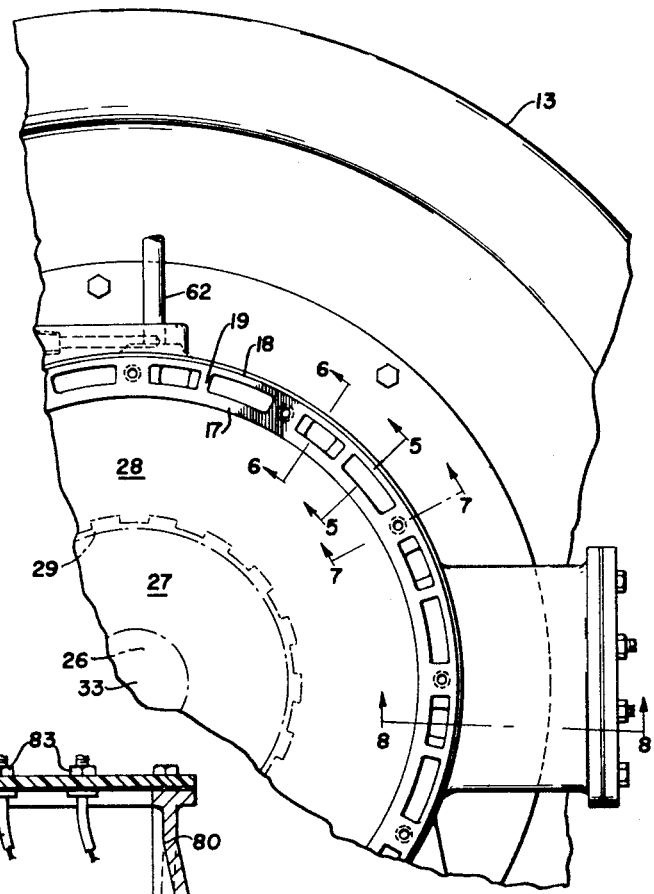
Fig.2
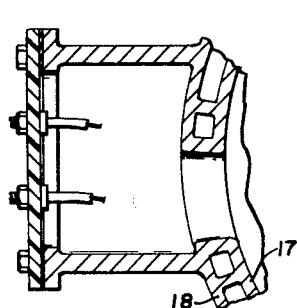
Fig.9
Fig.10
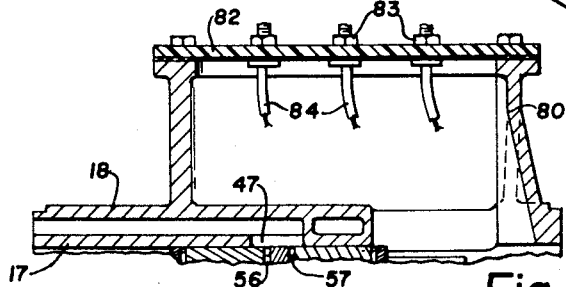
Fig.8
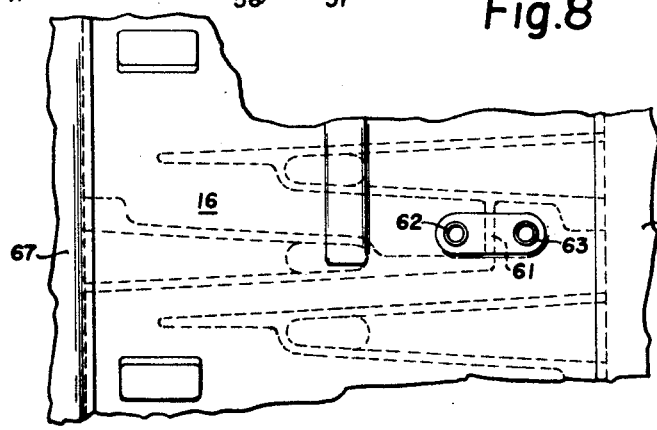
Fig.3
INVENTOR.
CLARENCE F. SCHWAN
BY Woodling and Krost,
attys.

Dec. 1, 1959   C. F. SCHWAN   2,915,656
HEAT EXCHANGER FOR DYNAMOELECTRIC MACHINE
Filed Oct. 19, 1956   3 Sheets-Sheet 3
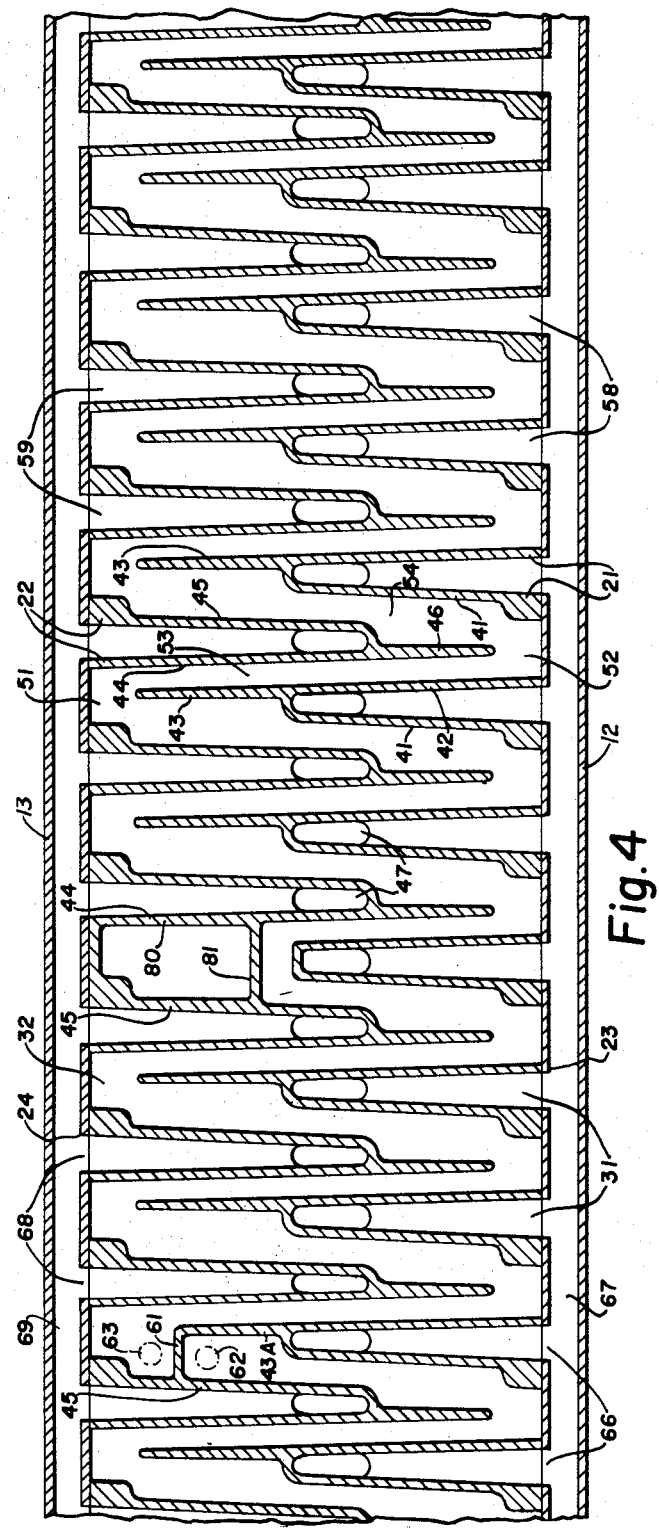
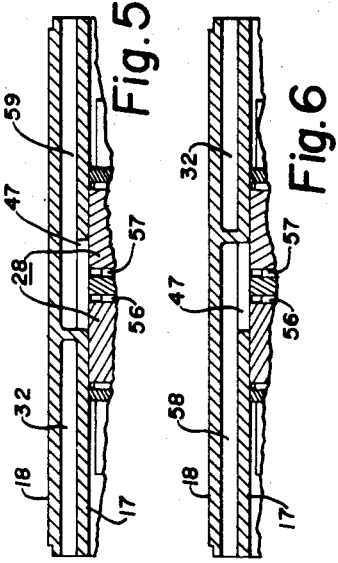
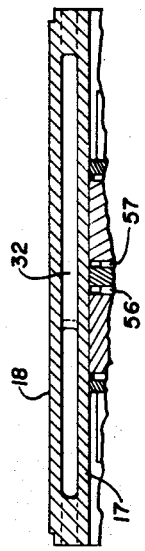
INVENTOR.
CLARENCE F. SCHWAN
BY
Woodling and Krost,
attys.

United States Patent Office 2,915,656
Patented Dec. 1, 1959

2,915,656

HEAT EXCHANGER FOR DYNAMOELECTRIC MACHINE

Clarence F. Schwan, Warrensville Heights, Ohio, assignor to The Reliance Electric & Engineering Company, a corporation of Ohio Application October 19, 1956, Serial No. 616,996

10 Claims. (Cl. 310—57)

The invention relates in general to heat exchangers for machines and more particularly to a heat exchanger for a dynamoelectric machine which may be hermetically sealed so that the heat exchanger is that which is responsible for removing practically all the waste heat of the machine.

The heat exchanger may be used to advantage with that type of dynamoelectric machine known as a motor for driving a refrigeration compressor wherein the motor and compressor as a unit are hermetically sealed so that the refrigerant gas contained in the motor and compressor may not escape. Because the motor and compressor as a unit have no running seals, that is, no rotating shaft which extends out of the casing or frame of the combined unit, the unit may be made completely gas tight because the only elements which need extend through the casing are electrical conductors which may be sealed easily to prevent leakage of gas even when such gas is under pressure.

The prior art form of combined motors and compressors have in many instances been small units wherein the waste heat is not a particular problem, but in larger units the wattage losses become so great that efficient means must be achieved to remove such heat. The prior art has known water jacketed motors for cooling such motors driving refrigeration compressors, however, these water jackets are primarily effective only for cooling the stator and the rotor is not effectively cooled. Also, in centrifugal compressor motors it is highly desirable to have a driving motor with low starting current and relatively high starting torque. A motor with these characteristics is basically a low flux motor having relatively high copper losses and low iron losses. On the other hand, a water jacketed motor should have higher iron losses and lower copper losses for effective cooling, since the transfer of heat from the laminated stator structure to the frame is relatively efficient. The copper losses of such motor must be transferred either to the contained refrigerant gas and from the gas to the frame, or to the laminated structure and then to the frame. All water jacketed motors have hot rotors for the same reason as noted above. It is very difficult to transfer heat from the motor rotor to the gas and to the frame or from the motor rotor to the laminated stator and then to the frame. This is undesirable in a refrigeration motor because it causes a large shaft expansion as a result of the large temperature gradient between the hot rotor and shaft and the water cooled motor frame. This expansion of the shaft relative to the frame displaces the centrifugal impeller in its housing and may easily result in reduced efficiency of operation of the compressor.

An object of the invention accordingly is to provide a refrigeration compressor motor which has very little expansion of the shaft relative to the motor frame.

Another object of the invention is to provide a heat exchanger for a refrigeration compressor motor to efficiently extract heat from the rotor and shaft.

Another object of the invention is to provide a heat exchanger for a dynamoelectric machine wherein waste heat of both the rotor and stator of the machine is removed.

Another object of the invention is to provide a refrigeration compressor motor with a heat exchanger utilizing the contained refrigerant gas within the motor to circulate this gas over the rotor and stator and then to pass it through longitudinally extending passages in the frame of the motor to exchange the heat therein to a water passage which zigzags from end to end of the motor frame and around the periphery thereof so that this water passage also cools the frame and stator by direct contact.

Another object of the invention is to provide a heat exchanger for a dynamoelectric machine wherein first and second passageway means are provided in the frame of the machine with both passageway means being at substantially the same distance from the axis of the machine and with a cooling fluid being passed through one of the passageway means and with a second fluid being passed through the other passageway means and through the interior of the machine.

Another object of the invention is to provide a heat exchanger for a refrigeration compressor motor wherein refrigerant gas within the motor passes through the air gap between the rotor and stator to cool both thereof, and then passes radially outward through ducts in the stator to reach a plurality of paralleled gas passages which extend longitudinally and alternatively to the two bearing brackets at each end of the motor frame, and with this refrigerant gas then passing radially inwardly through enclosed spaces in each of the two bearing brackets to return to the intake of blowers mounted on the shaft of the motor at each end of the rotor, and with a water cooling passage zigzaging between the gas passages to remove heat therefrom.

Another object of the invention is to provide a heat exchanger for a dynamoelectric machine containing a gas therein wherein the gas is caused to move over the bearings of the machine and over the coil heads and windings of the machine to remove heat therefrom.

Other objects and a fuller understanding of this invention may be had by referring to the following description and claims, taken in conjunction with the accompanying drawings, in which:

Figure 2 is a partial end view of the motor with the bearing bracket removed;

Figure 3 is a top view of the motor of Figure 1;

Figure 4 is a developed view of the gas and water passages;

Figures 5, 6, 7, 8, 9 and 10 are sectional views taken on the lines 5—5 to 10—10, inclusive.

Figure 1:
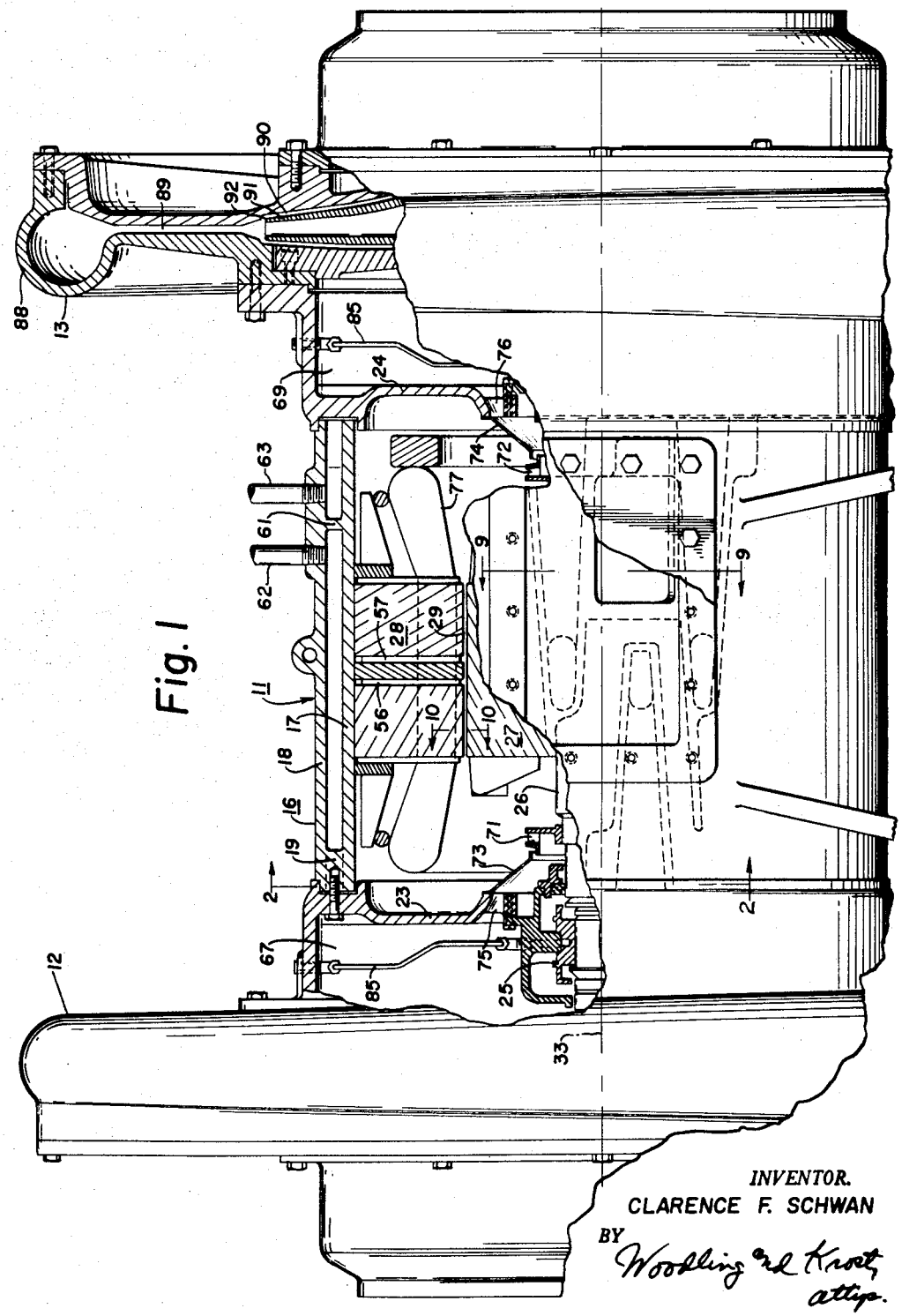
Figure 1 is a side elevational view partially in section of the invention as incorporated in a refrigeration compressor and motor unit.

The Figures 1 through 4 generally show the overall construction of a dynamoelectric machine 11 incorporating the invention. This machine 11 has been shown in the drawings for purposes of illustration but not limitation as a motor 11 driving a compressor 12 and a compressor 13. These compressors are coaxial with the motor 11 and on either end thereof. The motor 11 has a frame 16 which is defined by inner and outer frames 17 and 18. These inner and outer frames are separated by frame members 19 which include first and second wall members 21 and 22, respectively. The motor 11 also includes first and second bearing brackets 23 and 24, respectively, which carry bearings 25 for journalling a shaft 26 on which is fastened the rotor 27. This rotor 27 cooperates with a stator 28 through an air gap 29. The stator 28 is carried within and by the inner frame 17.

The Figure 4 shows in developed form a gas passageway 31 and a waterway 32. These gas and water passages are formed between the inner and outer frames 17 and 18 so that both are at substantially the same distance from the axis 33 of the shaft 26 and are also formed by the first and second wall members 21 and 22. The first wall members 21 include generally first, second, and third walls 41, 42, and 43, respectively, and the second wall members 22 include fourth, fifth, and sixth walls 44, 45, and 46, respectively. As shown in this specific embodiment of Figures 1 to 4, there is a total of twelve first and second generally radial wall members 21 and 22, each of which contains the three walls with certain exceptions as hereinafter mentioned. There is a total of twenty-four apertures 47 extending in a belt around the periphery of the motor frame, and are in the inner frame 17 to provide communication between the gas passageway means 31 and the interior of the motor. The first and second walls 41 and 42 together with the inner and outer frames 17 and 18 define gas passages leading to the first bearing bracket 23 and extending from alternate ones of the apertures 47. The fourth and fifth walls 44 and 45 define gas passages leading from the second bearing bracket 24 to the remaining apertures. The walls leading to a particular aperture lead to the far end of such aperture and are there joined together and circumscribe approximately one hundred eighty degrees of that one aperture. With respect to the first and second walls 41 and 42, at the junction thereof the third wall 43 extends toward the second bearing bracket 24; and with respect to the fourth and fifth walls 44 and 45, the sixth wall 46 extends from the junction thereof toward the first bearing bracket 23. The third wall 43 extends close to, but is spaced from, the second bearing bracket 24 to define a first water passage 51. Similarly, the sixth wall 46 extends toward, but stops short of, the first bearing bracket 23 to provide a second water passage 52. A third water passage 53 is provided between the inner and outer frames 17 and 18 and defined by the space between the second and third walls 42 and 43 and the fourth and sixth walls 44 and 46, and this third water passage joins the first and second water passages 51 and 52. A fourth water passage 54 between the inner and outer frames is defined by the space between the fifth and sixth walls 45 and 46 of one of the series of first and second wall members 21 and 22 and the first and third walls 41 and 43 of the adjacent first wall members. A plurality of first, second, third, and fourth water passages is defined by the series of first and second wall members 21 and 22, with these water passages being connected in series to form the waterway 32 which is a zigzag waterway.

First and second generally radial ventilating spaces 56 and 57 are provided between the laminations of the stator 28 generally along the belt of apertures 47. These ventilating spaces 56 and 57 extend from these apertures 47 to the air gap 29 and thus provide communication from this air gap to the gas passageway means 31.

The gas passageway means 31 generally includes a plurality of paralleled first gas passages 58 extending from alternate ones of the apertures 47 to the first bearing bracket 23, and also includes a plurality of paralleled second gas passages 59 extending from the remaining apertures to the second bearing bracket 24. It will be noted that the first gas passages 58 are defined by the first and second walls 41 and 42 and that the second gas passages are defined by the fourth and fifth walls 44 and 45. Also, twelve such first gas passages and twelve such second gas passages are shown in the drawing for purposes of illustration.

In one of the series of first wall members 21 the third wall 43A is foreshortened and a seventh wall 61 is provided which extends to the adjacent fifth wall 45 of the adjacent one of the series of second wall members 22. This seventh wall 61 blocks the first water passage at that point to form two ends of the zigzag waterway 32. A water inlet 62 and a water outlet 63 are provided on either side of this seventh wall 61 and extend through the outer frame 18 to be connected to a water supply source and a drain, respectively.

Twelve openings 66 are provided in the first bearing bracket 23 for communicating with the twelve first gas passages 58 and to provide communication to a first enclosed space 67 within the bearing bracket 23 or as defined by surfaces of this bearing bracket 23 and the adjacent compressor 12. Twelve openings 68 are provided in the second bearing bracket 24 for communicating the second gas passages 59 with a second enclosed space 69 within the bearing bracket 24, as defined by surfaces of the bearing bracket 24 and the adjacent compressor 13. First and second blowers 71 and 72 are mounted on the shaft 26 near each end of the frame and are centrifugal type blowers having a radially outward discharge or outlet and having the inlet on the radially inward side of such blowers. Shields 73 and 74 are mounted on the bearing brackets 23 and 24, respectively, to direct the contained refrigerant gas to the intake of the blowers 71 and 72. A series of openings 75 and 76 near the center of each of the bearing brackets 23 and 24 and inboard of the shields 73 and 74 provide communication of gas from the enclosed spaces 67 and 69 to the intake of the blowers 71 and 72. This means that when the shaft 26 is rotating the blowers 71 and 72 circulate gas through the interior of the motor frame to collect heat from the rotor 27 and the stator 28, including the coil heads 77. This gas flows through the air gap 29 inwardly from each end, or also may flow through axial and central radial slots in the rotor. The Figures 1 and 10 show that the stator windings 78 may be depressed to provide a larger effective cross-sectional area through which the refrigerant gas may pass. This gas is circulated to the ventilating spaces 56 and 57 and then passes radially outwardly through these ventilating spaces and through the apertures 47 to the first and second gas passages 58 and 59. From here the gas travels longitudinally in divided paths to the first and second bearing brackets 23 and 24. During its passage between the inner and outer frames 17 and 18, the walls of these gas passages are cooled by being also the walls which define the zigzag waterway 32. The heat loss of the motor 11 is thus given up to the water within the waterway and the gas then passes radially inwardly through the two enclosed spaces 67 and 69 to return to the intake of the blowers 71 and 72.

Another of the third walls 43 in the series of first wall members 21 is omitted as shown in Figure 8 to provide space for an electrical conduit 80. An eighth wall 81 bridges between the fourth wall 44 of one series of second wall members to the adjacent fifth wall 45 of the adjacent series of second wall members 22. The electrical conduit 80 is partially bounded by these fourth, fifth, and eighth walls and extends from the interior to the exterior of the motor frame 16. A conductor terminal board 82 closes the end of the electrical conduit 80 to preserve the hermetically sealed condition of the motor 11. Terminals 83 are provided for exterior connection to conductors 84 which lead to the armature windings 78 on the stator 28. In this case the motor 11 is an induction motor utilizing a squirrel cage rotor which requires no armature or brushes. This eliminates maintenance and readily closed lubricant passages 85 may lead from the exterior of the motor frame to each bearing for lubrication.

The gas passageway means 31 are shown as paralleled first gas passages 58 and as paralleled second gas passages 59, and may also be considered as first fluid passageway means which cooperate along a belt line with the interior of the dynamoelectric machine 11. Also, the waterway 32 is zigzag in configuration and extends from one end of the frame to the other end around the periphery of this frame 16 and may be considered as a second fluid passageway means for containing a cooling fluid. The system has been shown as double ended with enclosed spaces in both bearing brackets 23 and 24, yet considering one-half of the frame the cooling gas is circulated through the first gas passages 58 and gives up the heat therein to the cooling fluid in the zigzag waterway 32 to be a completely operative system. The motor 11 being connected to the compressors 12 and 13 establishes as a complete unit a hermetically sealed combination. Within the compressors 12 and 13, which may be completely independent compressors or which may be first and second stages of a multi-stage compressor, there is a volute casing 88 joined by a diffuser passage 89 to the impeller chamber 90 in which is mounted the impeller 91 driven by the shaft 26. It will be noted that the peripheral edge 92 of the impeller 91 is very closely spaced longitudinally relative to the diffuser passage 89. In the prior art form of water jacketed motors driving such centrifugal impellers, one had the difficulty of the rotor and shaft being much hotter than the motor frame which alone was water cooled. This meant that the rotor and shaft elongated considerably relative to the motor frame and this shifted longitudinally the impeller relative to the diffuser passage. Any such longitudinal shifting causes turbulence in the refrigerant gas being compressed at the junction of the peripheral edge 92 and the diffuser passage 89 to seriously impair the efficiency of this compressor. The present invention of a heat exchanger as shown embodied in a hermetically sealed motor and compressor unit efficiently cools the rotor and shaft as well as the stator and frame so that there is a minimum of elongation of the shaft relative to the motor frame and thus the impeller 91 is not materially shifted relative to the diffuser passage 89. This results in obtaining the efficiency in the compressor 13 for which it was designed.

Because of the refrigerant gas being present in both compressors 12 and 13, there is some leakage of refrigerant gas from the compressors into the interior of the motor 16. This is along the running seals between the motor 11 and the compressors 12 and 13; and therefore, this leakage, slight though it may be, establishes that the interior of the motor is filled with refrigerant gas and it is this gas which is circulated by the blowers 71 and 72. In actual practice it has been found that by using a refrigerant such as Freon 11 which is approximately three times as efficient as air as far as removing heat, because of its greater density and greater specific heat, adequate cooling of the interior of the motor may be achieved.

The distribution and placement of the zigzag waterway 32 is such that there is effective direct contact cooling of the inner frame 17 and consequently the stator 28. The Figures 4 and 5 show that there is good transfer of heat by direct contact from the stator 28 to the water passages 32. The waterway 32 is wide relative to the width of the gas passageway 31. The fact that the gas passageway is kept relatively narrow increases the heat transfer efficiency of this gas passageway. This is because there is more surface area for a given volume of gas and an increased gas velocity. The water passages are considerably wider so that the alternation of narrow gas passages with the wider water passages does not appreciably reduce the ability of the motor frame to remove heat from the stator core as compared to a completely water cooled frame. Also, both sides of each of the gas passages 31 and 32 are directly cooled by water, and these gas passages are paralleled for short unobstructed flow of the refrigerant gas so that the gas is quickly cooled in its travel in the frame of the machine to thus be effective in removing waste heat from the interior of the motor. The cool gas is introduced into the interior of the motor frame and first contacts the coil heads 77. Thus, these normally hot parts are quite efficiently cooled as contrasted with the normal water cooled frame wherein the heat in the coil heads must be dissipated by a long and relatively inefficient heat transfer path. In actual practice it has been found that the heat loss from a three hundred horsepower motor has effectively been dissipated by this heat exchanger of the present invention. The blowers 71 and 72 may be considered as a blower means for circulating gas and additionally may be considered as pump means for circulating a fluid through the interior of the dynamoelectric machine for cooling thereof.

The double ended arrangement of blowers 71 and 72 provides that gas flows longitudinally through the air gap 29 from each end toward the middle where the ventilating spaces 56 and 57 are located. This air gap is the smallest cross-sectional area through which the refrigerant gas must travel. By cutting in half the distance through which each portion of the gas must flow, namely, only half the length of the stator, greater efficiency is obtained because the rate of gas flow may be cut in half for the same cooling capacity. This lower rate of gas flow means a lower power input to the blowers 71 and 72 for greater overall efficiency of the motor 11.

The Figure 4 shows the simple arrangement of the frame 16 with the cores used in the manufacture of this cast frame simply and easily constructed. These cores are held at both ends, that is, both longitudinal ends of the frame, for rigid and exact placement of such cores and a minimum of set-up time in making this casting which becomes the frame 16. The simple design of the water cooled frame permits an expeditious manufacture in that the cores used to make the gas and water ducts in the casting may be pre-assembled in the core room and can be set up with a minimum amount of time on the foundry floor. This is in contradistinction to many other forms of water cooled frames wherein the cores were so complicated that the entire core had to be set up on the foundry floor which lost much valuable time on the foundry floor to thus increase the cost of the entire cast frame.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A heat exchanger for a hermetically sealed dynamoelectric machine with a stator and a rotor on a shaft and containing a fluid, said heat exchanger comprising, an outer and an inner annular frame defining the frame of said machine, said outer and inner frames being generally coaxial with said shaft and spaced apart by a plurality of wall members, a bearing bracket connected to one end of said machine frame, said wall members defining first fluid passageway means extending longitudinally from said bearing bracket to a belt line circumscribing said machine frame, said wall members also defining second fluid passageway means which zigzags from one end of the machine frame to the other and in contact with both sides of said first fluid passageway means and which extends around the periphery of said machine frame, a water inlet and a water outlet connected to one of said fluid passageway means and extending through said outer frame for exterior connection to a water pressure source and a drain; surfaces defining apertures along said belt line and extending through said inner frame and connecting the other of said fluid passageway means with the interior of said machine frame, surfaces including said bearing bracket defining an enclosed space, openings communicating said enclosed space with said other of said fluid passageway means, pump means in said machine frame and having an intake and an outlet, said outlet communicating with the interior of said machine frame to pump the contained fluid over said rotor and stator, and a series of openings in said bearing bracket to provide fluid communication from said enclosed space to said pump means intake, whereby fluid is circulated from said pump means through the interior of said machine to collect heat from said rotor and stator and said fluid then passes through said apertures and through said other of said fluid passageway means to exchange heat to the water in said one of said fluid passageway means, and then returns to the intake of said pump means through the enclosed space in said bearing bracket.

2. A heat exchanger for a hermetically sealed dynamoelectric machine with a stator and a rotor on a shaft and containing a gas, said heat exchanger comprising, an outer and an inner annular frame defining the frame of said machine, said outer and inner frames being generally coaxial with said shaft and spaced apart by a plurality of first and second wall members, first and second bearing brackets connected to the two ends of said machine frame, said first wall members defining a plurality of paralleled first fluid passageway means extending longitudinally from said first bearing bracket to a generally central belt line circumscribing the periphery of said machine, said plurality of first and second wall members also defining second fluid passageway means which zigzags from one end of the machine frame to the other and in contact with the sides of said first fluid passageway means and which extends around the periphery of said machine frame, a water inlet and a water outlet connected to one of said first and second fluid passageway means and extending through said outer frame for exterior connection to a water pressure source and a drain, surfaces defining apertures at said belt line and extending through said inner frame and connecting the other of said first and second fluid passageway means with the air gap between said stator and rotor, surfaces defining an enclosed space within said first bearing bracket, openings communicating said enclosed space with said other of said first and second fluid passageway means, blower means in said machine frame and having an intake and an outlet, said outlet communicating with the interior of said machine frame to blow the contained gas over said rotor and stator, and a series of openings in said first bearing bracket to provide fluid communication from said enclosed space to said blower means intake, whereby gas is circulated from said blower means through the interior of said machine including said air gap to collect heat from said rotor and stator and said gas passes through said apertures and through said other of said first and second fluid passageway means to exchange heat to the water in said one of said first and second fluid passageway means, and then returns to the intake of said blower means through the enclosed space in said first bearing bracket.

3. A heat exchanger for a hermetically sealed dynamoelectric machine with a stator and a rotor on a shaft and containing a gas, said heat exchanger comprising, an outer and an inner annular frame defining the frame of said machine, said outer and inner frames being generally coaxial with said shaft and spaced apart by a plurality of first and second wall members, first and second bearing brackets connected to the two ends of said machine frame, surfaces defining apertures extending through said inner frame and communicating with the air gap between said stator and rotor along a generally central belt circumscribing the periphery of said machine frame, said first wall members defining a plurality of paralleled gas passages extending longitudinally from said first bearing bracket to selected ones of said apertures, said plurality of first and second wall members also defining waterway means which zigzags from one end of the machine frame to the other and in contact with both sides of said gas passages and extends around the periphery of said machine frame, two ends on said zigzag waterway means, a water inlet and a water outlet connected to the two ends of said zigzag waterway means and extending through said outer frame for exterior connection to a water pressure source and a drain, surfaces defining an enclosed space within said first bearing bracket, openings communicating said enclosed space with said gas passages, blower means in said machine frame and having an intake and an outlet, said outlet communicating with the interior of said machine frame to blow the contained gas over said rotor and stator, and a series of openings in said first bearing bracket to provide gas communication from said enclosed space to said blower means intake, whereby gas is circulated from said blower means through the interior of said machine including said air gap to collect heat from said rotor and stator and said gas passes through said apertures and through said plurality of gas passages to exchange heat to the water in said zigzag waterway means, and then returns to the intake of said blower means through the enclosed space in said first bearing bracket.

4. A heat exchanger for a hermetically sealed electrical motor with a stator and a rotor on a shaft and containing a gas, said heat exchanger comprising, an outer and an inner annular frame defining the frame of said motor, said outer and inner frames being generally coaxial with said shaft and spaced apart by a plurality of first and second wall members, first and second bearing brackets connected to the two ends of said motor frame, surfaces defining apertures extending through said inner frame and communicating with the interior of said motor frame along a belt generally centrally of the length of said motor frame, said first wall members defining a plurality of paralleled first gas passages extending longitudinally from said first bearing bracket to alternate ones of said apertures, said second wall members defining a plurality of paralleled second gas passages extending longitudinally from said second bearing bracket to the remaining apertures, said plurality of first and second wall members also defining waterway means which zigzags from one end of the motor frame to the other and in contact with both sides of said first and second gas passages and extends around the periphery of said motor frame, two ends on said zigzag waterway means, a water inlet and a water outlet connected to the two ends of said zigzag waterway means and extending through said outer frame for exterior connection to a water pressure source and a drain, surfaces defining first and second enclosed spaces within said first and second bearing brackets, respectively, openings communicating said first enclosed space with said first gas passages, additional openings communicating said second enclosed space with said second gas passages, blower means in said motor frame and having an intake and an outlet, said outlet communicating with the interior of said motor frame to blow the contained gas over said rotor and stator, and a series of openings in each said bearing bracket to provide gas communication from said first and second enclosed spaces, respectively, to said blower means intake, whereby gas is circulated from said blower means through the interior of said motor to collect heat from said rotor and stator and said gas passes through said apertures and through said plurality of first and second gas passages to exchange heat to the water in said zigzag waterway means, and then returns to the intake of said blower means through the enclosed spaces in said bearing brackets.

5. A heat exchanger for a hermetically sealed motor with a stator and a rotor on a shaft and containing a gas, said heat exchanger comprising, an outer and an inner generally cylindrical frame defining the frame of said motor, said outer and inner frames being generally coaxial with said shaft and spaced apart by a plurality of first and second wall members, first and second bearing brackets connected to the two ends of said motor frame, surfaces defining apertures extending through said inner frame and communicating with the air gap between said stator and rotor along a belt generally centrally of the length of said motor frame, said first wall members defining a plurality of paralleled first gas passages extending longitudinally from said first bearing bracket to alternate ones of said apertures, said second wall members defining a plurality of paralleled second gas passages extending longitudinally from said second bearing bracket to the remaining apertures, said plurality of first and second wall members also defining a waterway which zigzags from one end of the motor frame to the other between each said first and second gas passages and extends around the periphery of said motor frame, two ends on said zigzag waterway, a water inlet and a water outlet connected to the two ends of said zigzag waterway and extending through said outer frame for exterior connection to a water pressure source and a drain, surfaces defining first and second enclosed spaces within said first and second bearing brackets, respectively, openings communicating said first enclosed space with said first gas passages, additional openings communicating said second enclosed space with said second gas passages, blower means in said motor frame and having an intake and an outlet, said outlet communicating with the interior of said motor frame to blow the contained gas over said rotor and stator, and a series of openings in each said bearing bracket to provide gas communication from said first and second enclosed spaces, respectively, to said blower means intake, whereby gas is circulated from said blower means through the interior of said motor including said air gap to collect heat from said rotor and stator and said gas passes through said apertures and through said plurality of first and second gas passages to exchange heat to the water in said zigzag waterway, and then returns to the intake of said blower means through the enclosed spaces in said bearing brackets.

6. A heat exchanger for a hermetically sealed motor with a stator and with a rotor on a shaft, said motor having a generally cylindrical frame, said heat exchanger comprising, an outer and an inner generally cylindrical annular frame as part of said motor frame, said outer and inner frames being coaxial with said shaft and spaced apart by a series of first and second generally radial wall members, first and second bearing brackets connected to the two ends of said motor frame and journalling said shaft, surfaces defining twenty-four apertures extending through said inner frame along a belt generally centrally of the length of said motor frame, ventilating spaces radially through said stator from said apertures to the air gap between said rotor and stator, said first wall members defining twelve paralleled first gas passages extending longitudinally from said first bearing bracket to alternate ones of said apertures, said second wall members defining twelve paralleled second gas passages extending longitudinally from said second bearing bracket to the remaining ones of said apertures, said series of first and second wall members also defining a zigzag waterway having two ends and extending around the periphery of said motor frame, a water inlet and a water outlet connected to the two ends of said zigzag waterway and extending through said outer frame for exterior connection to a water pressure source and a drain, a conduit wall in only one of said series of first and second wall members and extending transversely, a conduit for electrical conductors bounded by said conduit wall and extending from the interior to the exterior of said motor frame, a conductor terminal board covering the exterior end of said conduit to preserve the hermetically sealed condition of said motor, surfaces defining first and second enclosed spaces within said first and second bearing brackets, respectively, twelve openings communicating said first enclosed space in said first bearing bracket with the twelve first gas passages, twelve additional openings communicating said second enclosed space in said second bearing bracket with the twelve second gas passages, first and second blowers near opposite ends of said motor frame and each having an intake and an outlet, said outlets of both blowers communicating with the interior of said motor frame to blow gas over said rotor and stator, and a series of openings in each said bearing bracket to provide gas communication from said first and second enclosed spaces, respectively, to said intakes of said first and second blowers, whereby gas is circulated from said blowers through the interior of said motor including said air gap and said ventilating spaces to collect heat from said rotor and stator and said gas passes through said apertures and through said series of first and second gas passages to exchange heat to the water in said zigzag waterway, and then returns to the intake of said blowers through the enclosed spaces in said bearing brackets.

7. A heat exchanger for a hermetically sealed motor with a shaft, an outer and an inner generally cylindrical annular frame defining the frame of said motor, said outer and inner frames being generally coaxial with said shaft and spaced apart by a series of first and second generally radial wall members, first and second bearing brackets connected to the two ends of said motor frame, surfaces defining apertures extending through said inner frame and communicating with the interior of said motor along a belt generally centrally of the length of said motor frame, said first wall members defining a plurality of paralleled first gas passages extending longitudinally from said first bearing bracket to alternate one of said apertures, said second wall members defining a plurality of paralleled second gas passages extending longitudinally from said second bearing bracket to the remaining ones of said apertures, said series of first and second wall members also defining a zig-zag waterway having two ends and extending from one end to the other of said motor frame and extending around the periphery of said motor frame, a water inlet and a water outlet to the two ends of said zig-zag waterway and extending through said outer frame for exterior connection to a water pressure source and a drain, surfaces defining first and second enclosed spaces within said first and second bearing bracket, respectively, openings communicating said first enclosed space with said first gas passages, additional openings communicating said second enclosed space with said second gas passages, first and second blowers operated from said shaft near opposite ends of said motor frame and each having an intake and an outlet, said outlets of both blowers communicating with the interior of said motor frame to blow gas thereinto, and a series of openings in each said bearing bracket to provide gas communication from said first and second enclosed spaces, respectively, to said intakes of said first and second blowers, whereby gas is circulated from said blowers through the interior of said motor to collect heat therefrom and said gas passes through said apertures and through said paralleled first and second gas passages to exchange heat to the water in said zig-zag waterway, and then returns to the intake of said blowers through the enclosed spaces in said bearing brackets.

8. A heat exchanger for a hermetically sealed motor with a stator and with a rotor on a shaft, an outer and an inner generally cylindrical annular frame defining the frame of said motor, said outer and inner frames being coaxial with said shaft and spaced apart by a series of first and second generally radial wall members, first and second bearing brackets connected to the two ends of said motor frame, surfaces defining apertures extending transversely through said inner frame along a belt generally centrally of the axial length of said motor frame, ventilating spaces radially through said stator from said apertures to the air gap between said rotor and stator, each said first wall members including first, second, and third walls with said first and second walls circumferentially spaced apart for a first gas passage therebetween and extending longitudinally from said first bearing bracket and joining together at the far end of one of said apertures to circumscribe approximately one hundred eighty degrees of said one aperture, said third wall extending longitudinally from the junction of said first and second walls toward said second bearing bracket but terminating short thereof to provide a first water passage between the end of said third wall and said second bearing bracket, each said second wall members including fourth, fifth, and sixth walls with said fourth and fifth walls spaced apart for a second gas passage therebetween and extending longitudinally from said second bearing bracket and joining together at the far end of one of said apertures to circumscribe approximately one hundred eighty degrees of said one aperture, said sixth wall extending longitudinally from the junction of said fourth and fifth walls toward said first bearing bracket but terminating short thereof to provide a second water passage between the end of said sixth wall and said first bearing bracket, a third water passage between said outer and inner frames defined by the space between said second and third walls and said fourth and sixth walls and joining said first and second water passages, a fourth water passage between said outer and inner frames defined by the space between said fifth and sixth walls of one of the series of first and second wall members and the first and third walls of the adjacent first wall members, there being a plurality of first, second, third, and fourth water passages defined by said series of first and second wall members with said water passages being connected in series to form a zig-zag waterway having two ends and extending around the periphery of said motor frame, a water inlet and a water outlet connected to the two ends of said zig-zag waterway and extending through said outer frame for exterior connection to a water pressure source and a drain, the series of first and second wall members also defining paralleled first gas passages communicating with said first bearing bracket and defining paralleled second gas passages communicating with said second bearing bracket, surfaces defining first and second enclosed spaces within said first and second bearing brackets, respectively, openings communicating said first enclosed space with said first gas passages, additional openings communicating said second enclosed space with said second gas passages, first and second blowers operated from said shaft near opposite ends of said motor frame and each having an intake and an outlet, said outlets of both blowers communicating with the interior of said motor frame to blow gas over said rotor and stator, and a series of openings in each said bearing bracket to provide gas communication from said first and second enclosed spaces, respectively, to said intakes of said first and second blowers, whereby gas is circulated from said blowers through the interior of said motor including said air gap and said ventilating spaces to collect heat from said rotor and stator and said gas passes through said apertures and through said series of first and second gas passages to exchange heat to the water in said zig-zag waterway, and then returns to the intake of said blowers through the enclosed spaces in said bearing brackets.

9. A heat exchanger for a hermetically sealed motor with a stator and with a rotor on a shaft, said motor having a generally cylindrical frame, said heat exchanger comprising, an outer and an inner generally cylindrical annular frame as part of said motor frame, said outer and inner frames being coaxial with said shaft and spaced apart by a series of twelve first and second generally radial wall members, first and second bearing brackets connected to the two ends of said motor frame and journalling said shaft, surfaces defining twenty-four apertures extending generally radially through said inner frame along a belt generally centrally of the axial length of said motor frame, ventilating spaces radially through said stator from said apertures to the air gap between said rotor and stator, each said first wall members including first, second, and third walls with said first and second walls circumferentially spaced apart for a first gas passage therebetween and extending longitudinally from said first bearing bracket and joining together at the far end of one of said apertures to circumscribe approximately one hundred eighty degrees of said one aperture, said third wall extending longitudinally from the junction of said first and second walls toward said second bearing bracket but terminating short thereof to provide a first water passage between the end of said third wall and a first closure surface on said second bearing bracket, each said second wall members including fourth, fifth, and sixth walls with said fourth and fifth walls spaced apart for a second gas passage therebetween and extending longitudinally from said second bearing bracket and joining together at the far end of one of said apertures to circumscribe approximately one hundred eighty degrees of said one aperture, said sixth wall extending longitudinally from the junction of said fourth and fifth walls toward said first bearing bracket but terminating short thereof to provide a second water passage between the end of said sixth wall and a second closure surface on said first bearing bracket, a third water passage between said outer and inner frames defined by the space between said second and third walls and said fourth and sixth walls and joining said first and second water passages, a fourth water passage between said outer and inner frames defined by the space between said fifth and sixth walls of one of the series of first and second wall members and the first and third walls of the adjacent first wall members, there being a plurality of first, second, third, and fourth water passages defined by said series of first and second wall members with said water passages being connected in series to form a zigzag waterway extending around the periphery of said motor frame, a seventh wall extending from one of said third walls to the adjacent fifth wall of the adjacent one of the series of second wall members to block said first water passage at that point to form two ends of said zigzag waterway, a water inlet and a water outlet on opposite sides of said seventh wall to be connected to the two ends of said zigzag waterway and extending through said outer frame for exterior connection to a water pressure source and a drain, said third wall being omitted in only one of said series of first and second wall members and an eighth wall extending transversely from said fourth wall of that same series to the fifth wall of the adjacent series of first and second wall members, a conduit for electrical conductors bounded by said last mentioned fourth, fifth, and eighth walls and extending from the interior to the exterior of said motor frame, a conductor terminal board covering the exterior end of said conduit to preserve the hermetically sealed condition of said motor, the series of first and second wall members also defining twelve paralleled first gas passages communicating with said first bearing bracket and twelve paralleled second gas passages communicating with said second bearing bracket, surfaces defining first and second enclosed spaces within said first and second bearing brackets, respectively, twelve openings communicating said first enclosed space in said first bearing bracket with the twelve first gas passages between said series of first and second walls, twelve additional openings communicating said second enclosed space in said second bearing bracket with the twelve second gas passages between said series of fourth and fifth walls, first and second blowers on said shaft near opposite ends of said motor frame and each having an intake and an outlet, said outlets of both blowers communicating with the interior of said motor frame to blow gas over said rotor and stator, and a series of openings near the center of each said bearing bracket to provide gas communication from said first and second enclosed spaces, respectively, to said intakes of said first and second blowers, whereby gas is circulated from said blowers through the interior of said motor including said air gap and said ventilating spaces to collect heat from said rotor and stator and said gas passes through said apertures and through said series of first and second gas passages to exchange heat to the water in said zigzag waterway, and then returns to the intake of said blowers through the enclosed spaces in said bearing brackets.

10. A heat exchanger for a motor with a stator and a rotor on a shaft and containing a gas, said heat exchanger comprising, an outer and an inner frame defining the frame of said motor, said outer and inner frames being spaced apart by a plurality of first and second wall members, first and second bearing brackets connected to the two ends of said motor frame, surfaces defining apertures extending through said inner frame and communicating with the air gap between said stator and rotor along a belt generally centrally of the length of said motor frame, said first wall members defining a plurality of paralleled first gas passages extending longitudinally from said first bearing bracket to alternate ones of said apertures, said second wall members defining a plurality of paralleled second gas passages extending longitudinally from said second bearing bracket to the remaining apertures, said wall members also defining a cooling waterway for said gas passages, surfaces defining first and second enclosed spaces within said first and second bearing brackets, respectively, openings communicating said first and second enclosed spaces with said first and second gas passages, blower means in said motor frame and having an intake and an outlet, said outlet communicating with the interior of said motor frame to blow the contained gas over said rotor and stator, and openings in each said bearing bracket to provide gas communication from said first and second enclosed spaces, respectively, to said blower means intake, whereby a pressure differential from each end to the middle of the air gap is established so that gas is circulated from said blower means through the interior of said motor including said air gap to collect heat from said rotor and stator and said gas passes through said apertures and through said plurality of first and second gas passages to exchange heat to the water in said waterway, and then returns to the intake of said blower means through the enclosed spaces in said bearing brackets.

References Cited in the file of this patent

UNITED STATES PATENTS

| | | |
|---|---|---|
| 2,414,532 | Johns | Jan. 21, 1947 |
| 2,683,227 | Beckwith | July 6, 1954 |
| 2,722,616 | Moses | Nov. 1, 1955 |
| 2,746,269 | Moody | May 22, 1956 |

FOREIGN PATENTS

| | | |
|---|---|---|
| 118,392 | Great Britain | Aug. 29, 1918 |
| 672,623 | Germany | Mar. 6, 1939 |